April 17, 1951     W. V. MORTON     2,548,996
DIFFUSION APPARATUS

Filed Jan. 8, 1947     2 Sheets-Sheet 1

INVENTOR
WHIPPLE V. MORTON
Charles S. Evans
his ATTORNEY

April 17, 1951 W. V. MORTON 2,548,996
DIFFUSION APPARATUS
Filed Jan. 8, 1947 2 Sheets-Sheet 2
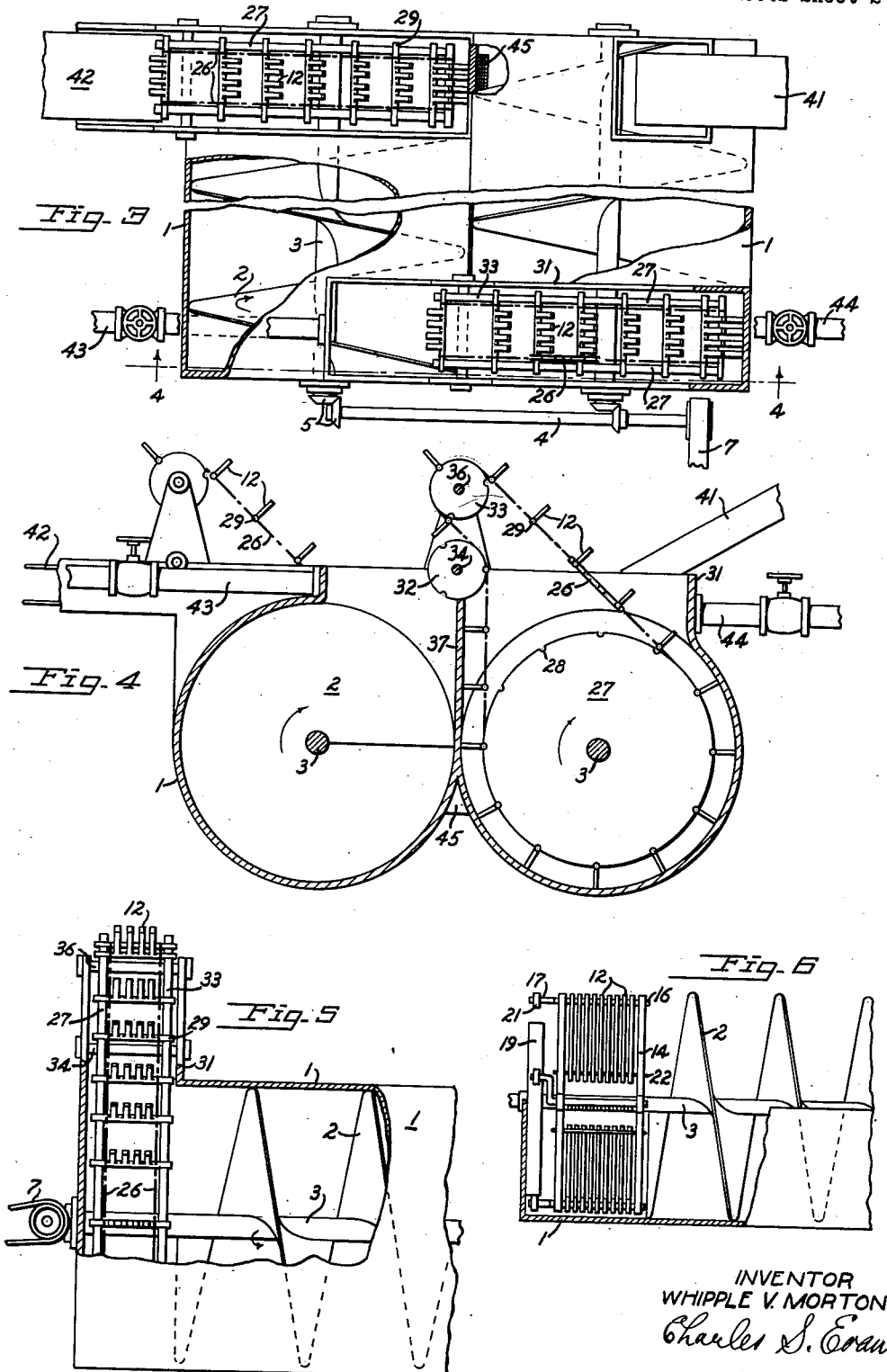
INVENTOR
WHIPPLE V. MORTON
Charles S. Evans
his ATTORNEY Patented Apr. 17, 1951

2,548,996

UNITED STATES PATENT OFFICE 2,548,996

DIFFUSION APPARATUS

Whipple Vincent Morton, San Francisco, Calif.

Application January 8, 1947, Serial No. 720,905

3 Claims. (Cl. 127—7)

My invention relates to diffusion apparatus, and particularly to an apparatus for the continuous lixiviation of solid materials, such as cossettes.

It is among the objects of my invention to provide an apparatus for continuously lixiviating cossettes, and similar materials, wherein solid materials are moved continuously along each of a series of cells and are transferred from each cell to the succeeding cell of the series, while liquid is moved with the solid material along the individual cells and is delivered from each cell to an adjacent cell in a direction opposite to the direction of movement of solid materials between cells.

Another object is to provide a diffusion apparatus provided with improved mechanism for mixing solids in unitary amounts with corresponding units of a lixiviating liquid in a series of cells and for separating and transferring the solids and liquids from one to another of the series in opposite order.

Another object is to provide a diffusion apparatus having high capacity and efficiency.

The invention possesses other objects, some of which with the foregoing will be set forth at length in the following description wherein are explained those forms of the invention which have been selected for illustration in the drawings accompanying and forming a part of this specification. In said drawings, illustrative forms of the invention are shown, but it is to be understood that it is not limited to those forms, since the invention as set forth in the claims may be embodied in a plurality of other forms.

In the drawings:

Figure 3 is a plan view of a modified form of my invention, portions being broken away.

Figure 4 is a transverse sectional view of the apparatus shown in Figure 3, the plane of the section being indicated by the line 4—4 of Figure 3.

Figure 5 is a fragmental side elevational view, partly in vertical longitudinal section of the apparatus of Figures 3 and 4.

Figure 6 is a fragmental side elevational view, partly in vertical longitudinal section, of the apparatus shown in Figures 1 and 2.

Figure 1:
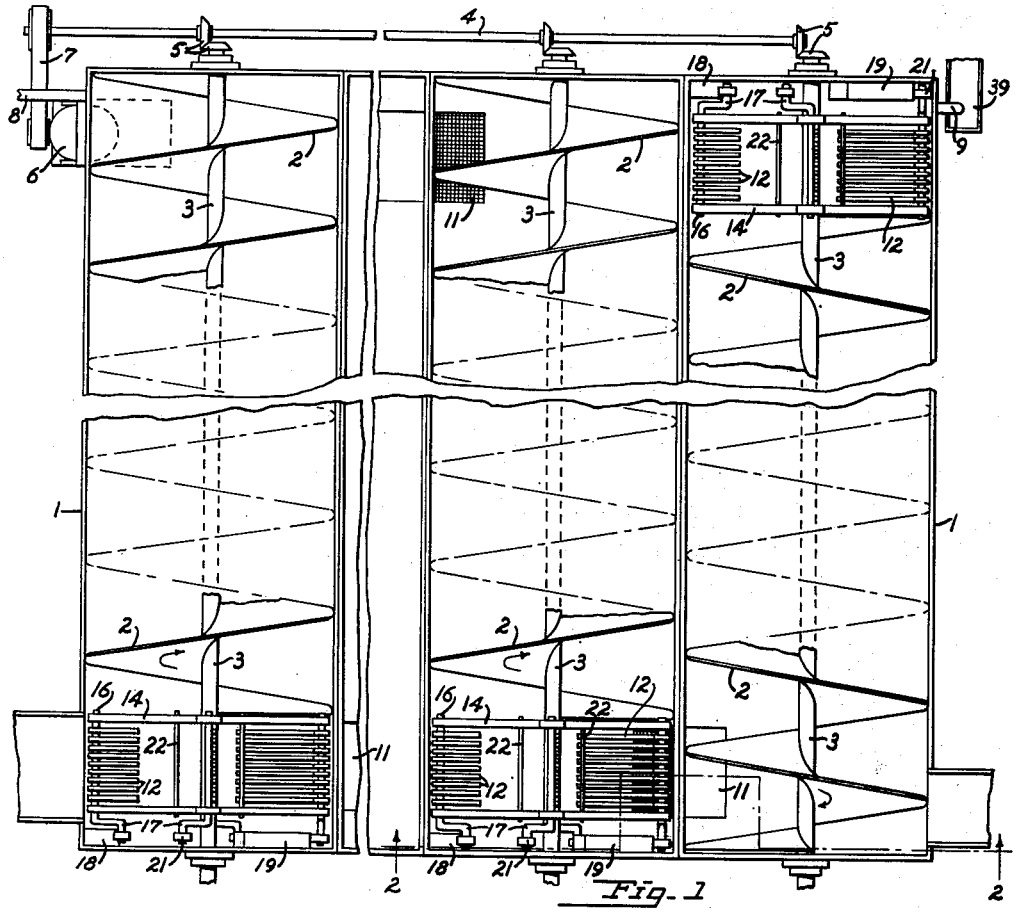
Figure 1 is a plan view of an apparatus embodying my invention, portions being broken away.

In terms of broad inclusion, the apparatus of my invention comprises a plurality of diffusion cells, each provided with power actuated means, such as a screw conveyor, for moving unitary amounts of solid materials, for example cossettes, mixed with corresponding unitary amounts of water or other lixiviating liquid, through the cells. Means are provided for transferring the solids from each cell to the next cell of the series in one order, and for transferring the liquid from cell to cell in the opposite order; the solids being lifted and drained before delivery from one cell to the next.

In terms of greater detail, the diffusion apparatus of my invention comprises a plurality of cells 1, arranged side by side in a series. Each cell is provided with a screw conveyor, designated in general by the numeral 2. The conveyors 2 extend longitudinally within the cells 1 and their shaft portions 3 are suitably journalled at points adjacent the ends of the cells. The spiral blades of the conveyors fit closely within the cells so that unitary amounts of solid materials will be trapped between successive turns of the spiral blade of each conveyor, and will be advanced progressively along the lengths of the cells from the solids supply to solids delivery ends thereof by rotation of the screw conveyors within the cells. The conveyors are all driven in the same direction by a shaft 4, connected to the shafts 3 of the conveyors 2, by gears 5. The shaft 4 is actuated by a motor 6 connected to the shaft by a belt 7 or other suitable drive connection. The conveyors are of alternately opposite pitch so that, while the conveyor shafts are all rotated in the same direction, the materials will be advanced in opposite directions along adjacent cells.

Water or other lixiviating liquid is passed through the cells successively from a supply connection 8 at the solids delivery end of the series to an outlet 9 at the solids supply end of the series. The liquid is trapped in unitary amounts between successive turns of the spiral blades of the conveyors along with a unitary amount of solid material mixed and moved therewith from one end to the other of the cells. The liquid from each of the several cells flows to the next adjacent cell through connecting passages 11 screened on the inlet end thereof and arranged to permit flow of liquid from one cell to the cell next nearest the solids supply end of the series.

The solids are transferred from one cell to the next by means of suitable sets of combs 12, actuated by the screw conveyors 2, to lift the solids from the cells at the solids delivery end and deliver them into the solids supply end of the next succeeding cell. In the arrangement disclosed in Figures 1, 2 and 6, the combs 12 are pivoted upon radially disposed arms 14, secured to the conveyor shafts 3, by means of pivot rods 16. Levers 17 are connected to the combs 12. Cams 18 and 19, positioned at the ends of the cells 1 adjacent the arms 14, engage cam rollers 21 carried by the levers 17 for directing the movement of the combs 12. The cams 18 are shaped and positioned, as best shown in the center section of Figure 2, to swing the levers 17 and combs 12 upwardly as they emerge from the liquid contained in the cells. The combs move to a steeply inclined position such that solids lifted from the liquid will slide from the combs into the supply end of the next cell. As the combs clear the surface of the liquid, the liquid drains from the solid matter, so that no material portion of the liquid from one cell is carried with the solids to the adjacent cell.

As each cam roller 21 passes the high point of a cam 18, the comb swings back to a position substantially radial with respect to the cell 1 and its conveyor 2, the movement being limited by a stop rod 22. The roller 21 is carried into engagement with the outer face of the cam 19 for holding the comb in its radial position as it is moved downwardly into the liquid. As a comb sweeps through the liquid, it collects the solid material in advance of it. The collected solids are drained and removed from the cell in one direction as the roller 21 passes over the cam 18, while the liquid flows from the cell in an opposite direction through the passage 11.

In the arrangement disclosed in Figures 3, 4 and 5, the combs 12 are carried by an endless chain conveyor 26. Each conveyor 26 is actuated by means of a pair of spaced discs 27 secured to the shaft of the screw conveyor 2 with which it is associated. The edges of the discs 27 are provided with notches 28 for engaging cross rods 29 secured to the links of conveyor chains at opposite sides of the conveyor. The combs 12 are secured to the rods 29 and are held substantially normal to the plane of the conveyor 26 at all points along its length.

The cells 1 of the modification shown in Figures 3, 4 and 5 are tubular. The conveyors 26 pass upwardly through open topped extensions 31, and over pairs of idler discs 32 and 33 mounted upon shafts 34 and 36. The shafts 34 and 36 are positioned substantially over a partition 37 dividing the adjacent cells and their extensions 31.

The combs 12 are carried through the mixture of liquid and solids at the delivery end of a cell. Each comb collects a load of the solids, which it carries upwardly from one cell and dumps into the next succeeding cell. Liquid drains from the collected solids as they are lifted from the cells and carried upwardly over the lower idler discs 32 to the upper idler discs 33, for dumping.

Figure 2:
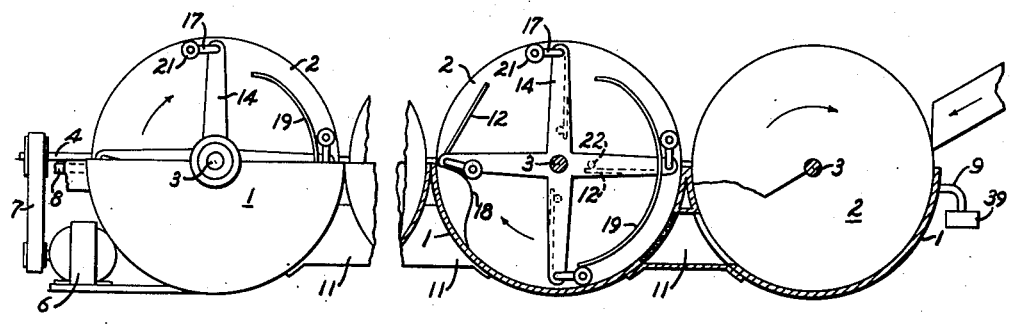
Figure 2 is a view partly in end elevation and partly in transverse section, the plane of the section being indicated by the line 2—2 of Figure 1.

In the arrangement shown in Figures 3, 4 and 5 the tubular cells 1 may be kept substantially filled with liquid and solids, so that the number of cells required to handle a specified volume of material may be substantially less than in the case of the open troughs shown in Figures 1 and 2.

In the operation of the apparatus shown in Figures 1 and 2, the cells are filled to normal working level with water or other lixiviating liquid. Thereafter, a continuous supply of the liquid is maintained from the supply connection 8 to the outlet 9, with the liquid passing through the cells successively. Preferably, the supply connection 8 is positioned at the solids supply end of the last cell so that incoming liquid and outgoing solids will be moved together along the length of the last cell to insure maximum extraction of the soluble material to be recovered. The cossettes, or other solid materials, are fed into the supply end of the first cell and are carried therealong with the outgoing liquid, the liquid being drained off at the end of the cell where the solids are removed.

The incoming solids are trapped in unit volumes, along with a corresponding volume of liquid, between successive turns of the screw conveyor helix; and the mixed units of solids and liquid are moved together along the length of the cell. Operation of the conveyor maintains enough agitation of the mixture of solids and liquid to obtain efficient extraction of soluble material. At the solids delivery end of the first cell, the solids are transferred to the next cell, while the liquid is drawn off into a trough 39 for further treatment. In the succeeding cells, each unit of the solids is mixed with a unit of liquid drained from the next succeeding cell. When the last cell is reached, incoming units of the solids are mixed with units of fresh incoming liquid, and remain in the fresh liquid as the mixed units are moved along the length of the unit. This insures substantially complete extraction of soluble matter.

The rate at which the liquid and solids are supplied may, of course, be varied to suit any requirement, as may also the rate at which the conveyors 2 are operated. The number and size of the cells depend upon the nature of the materials to be treated.

An apparatus suitable for extracting sugar from cossettes on practicable commercial scale may advantageously have the following capacities and dimensions:

| | |
|---|---:|
| Number of cells | 14 |
| Diameter of cells _____feet__ | 9 |
| Length of cells _____do____ | 15 |
| Working volume _____cubic feet__ | 409 |
| Working load cossettes _____tons__ | 5.11 |
| Total capacity cossettes_____do____ | 71.54 |
| Tons cossettes per hour _____ | 95.38 |
| Tons cossettes per day _____ | 2,289 |
| Retention time _____minutes__ | 45 |
| Number of complete juice changes_____ | 13 |

(Cossettes assumed to weigh 25 pounds per cubic foot, and the operating level 6 inches below maximum diameter.)

The operation of the apparatus of Figures 3, 4 and 5 is substantially the same, difference mainly in that the tubular cells may be operated at substantially full capacity, and the total capacity of an installation may be correspondingly increased. By increasing the length of the cells, the number of the cells in the series may be reduced, it being possible to obtain an efficient operation with a single pair of cells, as indicated in Figures 3 and 4. Cossettes are supplied through a chute 41 or other supply means; and after lixiviation, are delivered onto a conveyor 42 for further treatment or disposal.

The liquid is supplied through an inlet 43 positioned at the solids supply end of the last cell of the series, so that each incoming unit of solid material will be trapped with a unit of fresh liquid, and will be moved therewith along the length of the cell. At the solids delivery end of the cell, the solids are removed by a conveyor 26 for delivery onto the conveyor 42. The liquid drains through a screened passage 45 into the solids supply end of the next preceding cell where each unit of liquid is mixed with an incoming unit of solid material with which it is moved along the length of the cell. The liquid is drawn off through an outlet 44 at the solids delivery end of the first cell of the series. At that point, the liquid will have dissolved the major portion of solubles from the incoming solids; and is subjected to such further treatment as may be desirable for concentrating and removing the dissolved material.

I claim:

1. A diffusion battery comprising: a series of parallel, adjacent, horizontally disposed cells for containing solids and a liquid for lixiviating the solids, each of said cells being of substantially uniform cross-sectional area throughout its entire length; means for supplying solids into the first cell of the series at one end thereof for movement progressively through the cells in one order; means for supplying liquid into the last cell of the series for movement through the series in an opposite order; a screw conveyor in each cell for moving the solids and liquids along the cells progressively in unitary volumes; endless chain conveyors mounted at the solids discharge end of each cell and provided with combs for transferring solids from each cell to the next succeeding cell; means responsive to the rotation of the screw conveyors for actuating the chain conveyors; and means for transferring liquid from one end of one cell to the adjacent end of next cell in an order opposite the order of movement of the solids between cells.

2. A diffusion battery comprising: a series of parallel, adjacent, horizontally disposed cells for containing solids and a liquid for lixiviating the solids, each of said cells being of substantially uniform cross-sectional area throughout its entire length; means for supplying solids into the first cell of the series for movement progressively through the cells in one order; means for supplying liquid into the last cell of the series for movement through the series in an opposite order; a screw conveyor in each cell for moving the solids and liquids along the cells progressively in unitary volumes of mixture; endless chain conveyors mounted at the solids delivery ends of said cells and provided with combs for transferring solids from each cell to the next succeeding cell; notched discs upon the ends of the screw conveyors for actuating the chain conveyors; and means for transferring liquid from one cell to the next in an order opposite the order of movement of the solids between cells.

3. A diffusion battery comprising: a series of parallel, adjacent, horizontally disposed cells for containing solids and a liquid for lixiviating the solids, each of said cells being of substantially uniform cross-sectional area throughout its entire length; screw conveyors axially disposed within the cells and operable to advance unitary volumes of solids and liquid along the cells for lixiviation of the solids by the liquid; chain conveyors mounted within the ends of the cells and extending upwardly through the extensions for transferring solids from each cell to the next succeeding cell; drive means actuated by the screw conveyors for actuating the chain conveyors; and means for transferring liquid from each cell to the next in an opposite order.

WHIPPLE VINCENT MORTON.

REFERENCES CITED

The following references are of record in the file of this patent:

UNITED STATES PATENTS

| Number | Name | Date |
|--------|------|------|
| 140,461 | Bringier | July 1, 1873 |
| 459,654 | Sandys | Sept. 15, 1891 |
| 755,546 | Rak | Mar. 22, 1904 |

FOREIGN PATENTS

| Number | Country | Date |
|--------|---------|------|
| 558,547 | Germany | Sept. 8, 1932 |
| 519,710 | Germany | Mar. 3, 1931 |
| 510,642 | France | Sept. 10, 1920 |
| 318,451 | France | 1902 |
| 515,007 | Germany | Dec. 20, 1930 |
| 557,710 | Germany | Jan. 10, 1940 |